United States Patent

[11] 3,622,876

[72] Inventors Gary Ross Ure;
Donald Lee Degraffenreid; Robert Allen Savage, all of Orange County, Calif.
[21] Appl. No. 97,775
[22] Filed Dec. 14, 1970
[45] Patented Nov. 23, 1971
[73] Assignee Datatron, Inc.

[54] DIGITAL MODULE TESTER SYSTEM
7 Claims, 4 Drawing Figs.

[52] U.S. Cl. ............................................. 324/73 R
[51] Int. Cl. ............................................. G01r 15/12
[50] Field of Search ............................................. 324/73 R, 73 AT, 73 PC

[56] References Cited
UNITED STATES PATENTS

| | | | |
|---|---|---|---|
| 2,985,819 | 5/1961 | Russell | 324/73 X |
| 3,264,562 | 8/1966 | Brown et al. | 324/73 |
| 3,470,467 | 9/1969 | Crammer et al. | 324/73 |
| 3,492,572 | 1/1970 | Jones et al. | 324/73 |
| 3,500,457 | 3/1970 | Curley | 324/73 |

*Primary Examiner*—Rudolph V. Rolinec
*Assistant Examiner*—Ernest F. Karlsen
*Attorney*—Finkelstein & Mueth ABSTRACT: A digital module tester system for dynamically testing multipin digital circuit modules in which a separate programmable pin electronics card is provided for each pin of the module under test. A computer controls a single digital-to-analog converter to continuously update the drive level and monitoring limits of each pin electronics card. Each pin electronics card contains switching circuitry to permit operation in a voltage forcing or current forcing mode. In the voltage forcing mode, a pin driver differential amplifier forces a voltage at the pin under test. A precision resistor in series with the pin driver differential amplifier and the pin under test is monitored for current flow to the pin under test. Comparison circuitry compares the current flow with limit levels to provide an error indication in the event that the limits are exceeded. In the current forcing mode the pin driver differential amplifier provides a fixed current flow into the pin under test. The voltage at the pin under test is monitored and compared with limit levels to provide an error indication.

DIGITAL MODULE TESTER SYSTEM

BACKGROUND OF THE INVENTION

Field of the Invention

This invention relates to automatic testing systems and more particularly, to an improved combined digital module tester for providing automatic testing for a multipin digital module.

Description of the Prior Art

Throughout the electronics industry, particularly in the data processing industry, semiconductor logic circuits are packaged on individual plug-in cards. The input drive leads, power supply lead, output leads and the like are brought out on a multipin connector. These circuit cards operate on a wide variety of input and output levels and there is little uniformity among the industry as to the number of pins or the position of input, output and power supply connection pins. It is highly desirable for manufacturers of digital modules and large users of digital modules to be able to automatically or semiautomatically test digital module circuits. In order to test a digital module circuit, various pins of the module must be connected to selected bias and signal generating sources and to appropriate loads. Many prior art systems use a different driver circuit for each type of module being tested resulting in the need to employ a large number of different drive circuits to accommodate various digital module circuits.

In U.S. Pat. No. 3,492,572 to H. E. Jones et al. entitled Programmable Electronics Circuit Testing Apparatus Having Plural Multifunction Generating Circuits, a system is disclosed in which a plurality of multifunction test producing circuits are provided, each of which is selectively controllable to produce any one of the following circuit functions: driver, load, power supply, ground and open circuit. One of these multifunction test producing circuits is provided for each pin of the digital module under test. Each of the single circuit types is programmable, for example, under the computer control, to apply to each pin any selected one of the various conditions which are applied to any and all types of modules being tested. While Jones describes a flexible system permitting the selectable driving of a pin under test or the provision of a load for the pin under test, the monitoring and comparison is performed external to this test card. Since long lead lengths produce current losses and introduce inaccuracies it is highly desirable to provide the monitoring and comparison functions in close proximity to the circuitry providing the drive or load for the test. In addition, it is desirable to provide the testing card which can be switched from a voltage forcing mode to a current forcing mode of operation while still providing the monitoring and comparison functions.

In the voltage forcing mode of operation a voltage is forced into a pin and the current flowing through the pin is monitored and compared with selected limits. Whereas in the current forcing mode the current into a pin is kept constant while the voltage is monitored and compared with limits.

In order to produce the diversity of forcing levels, monitoring levels and limits to accommodate diversified modules it has been the normal practice in the data processing industry to provide a digital-to-analog converter which, under programmed control, provides an analog output level. Since each test card requires at least a drive level signal, a separate digital-to-analog converter is normally required for each test circuit. Since digital-to-analog converters which provide precise signals in addition to being expensive take up space and require power, it is highly desirable to provide a system in which a single digital-to-analog converter can be utilized to provide the drive, monitoring and limit levels for all of the test producing circuits.

SUMMARY OF THE INVENTION

In accordance with the present invention a digital module tester system is provided which overcomes the above-noted difficulties. The system includes a plurality of separate pin electronics cards which are independently programmable. Each pin of the digital module under test has its own pin electronics card. A single digital-to-analog converter is continuously scanned from the memory of a computer to update the drive and limit levels of each pin electronics card. Sample and hold amplifiers on each pin electronics card receive the digital-to-analog converter level signals and hold the levels. Switches on each pin electronics card selectively couple a logic one or a logic zero level driving signal through a pin driver differential amplifier and configure the card for a voltage forcing or current forcing mode of operation. In the voltage forcing mode the pin driver differential amplifier provides constant voltage to the pin under test. A precision resistor connected in series between the pin driver differential amplifier and the pin under test is monitored to determine the current flowing to the pin under test. This current signal is compared with the limits received from the digital-to-analog converter and in the event of exceeding the limits a flip-flop is activated to produce an error signal. In the current forcing mode the pin driver differential amplifier drives a fixed current through the precision resistor into the pin under test. The voltage at the pin under test is monitored and compared with the limits from the digital-to-analog converter and in the event of exceeding the limits a flip-flop is activated to produce an error signal.

One object of this invention is to provide a digital module tester system that can rapidly, automatically and simultaneously provide drive signal to a pin under test while monitoring and comparing the response at the pin.

Another object of the invention is to provide a test producing circuit having the drive, monitoring, comparison and error detection circuitry all located thereon.

Still another object of the present invention is to provide a digital module tester system in which a single digital-to-analog converter is employed to provide all the drive, monitoring, and limit levels.

Still other objects, features and attendant advantages of the invention will become apparent to those skilled in the art from a reading of the following description of an embodiment.

BRIEF DESCRIPTION OF THE DRAWINGS

An embodiment of the invention is disclosed more fully in the following detailed description taken together with the accompanying drawings wherein similar reference characters refer to similar elements throughout and in which.

DESCRIPTION OF THE PREFERRED EMBODIMENT

Figure 1:
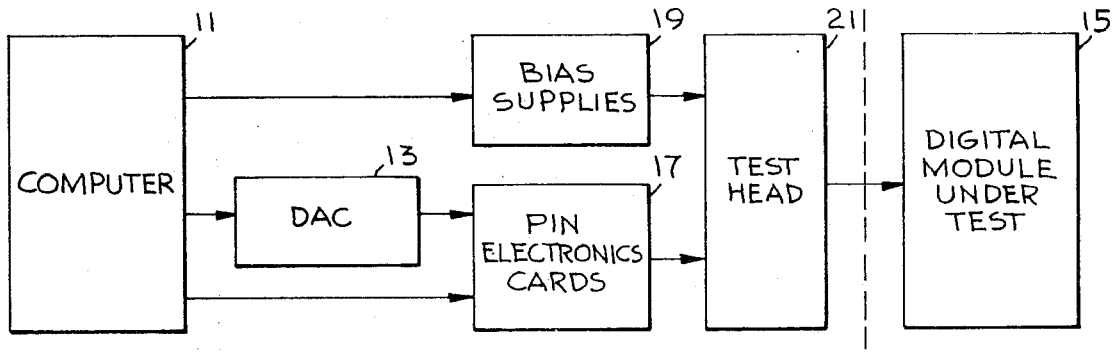
FIG. 1 is a functional block diagram of one embodiment of the invention.

Referring now to FIg. 1, there is shown an embodiment of the digital module test system constructed in accordance with the principles of the invention. Computer 11 exercises primary control over the system and establishes the test sequence and parameters according to an operational test program generated by an operator. Digital-to-analog converter 13 receives control signals from computer 11 and produces a single analog output which is a function of the control signals received from computer 11. The electrical interface between computer 11 and the pin on the digital module under test 15 is provided by the pin electronics card 17. The total number of pin electronics cards is determined by the number of pins on the module under test. Each pin is accommodated by a separate pin electronics card. The DC bias voltages for the digital module under test 15 are provided by bias supplies 19. The output of the individual bias supplies is controlled by computer 11. The head assembly 21 serves as the mechanical interface between the device under test and the digital module tester.

While the testing of a digital module is described in the present embodiment, the invention is not limited to testing such modules. Any digital or, for that matter, analog device may be tested utilizing the teachings of the invention.

The described embodiment utilizes six reference levels to test each functional pin on the module under test. Two forcing levels are employed to represent logic zero and logic one levels. These levels are applied as inputs to pins. Four window levels (two associated with each forcing level) establish the upper and lower limits for the monitored signals. When the voltage forcing level representing a logic one is applied to an input pin, the current flow into the pin is sampled and compared with the two current window levels for a logic one. Conversely, voltage windows are established when a current level is forced at an input pin. This method facilitates the simultaneous testing of both the functional capability and the DC parameters of a device.

The DC testing concerns itself with checking for such things as DC response levels, saturation currents and bias currents. The functional testing concerns checking the truth table response of the device to various logic inputs. In most prior art testers the system must be reconfigured to switch from DC testing to functional testing. The present invention permits one configuration to perform both testings and to perform them simultaneously.

The fixed reference levels required to test the pin are established by digital-to-analog converter 13 under the control of computer 11. Each level is stored in a separate sample and hold amplifier on the appropriate pin electronics card. Each pin electronics card is independent of the others and the sample and hold amplifiers on each card are continuously updated by the computer. Thus, each pin can be programmed individually. The updating of the sample and hold amplifier of pin electronics card 17 is performed independently and asychroniously of any other test being conducted. The use of separate analog memories in the form of sample to hold amplifiers on the individual pin electronics card to establish the reference levels permits the utilization of a single digital-to-analog converter (DAC) rather than separate digital-to-analog converters for each reference level.

Figure 2:
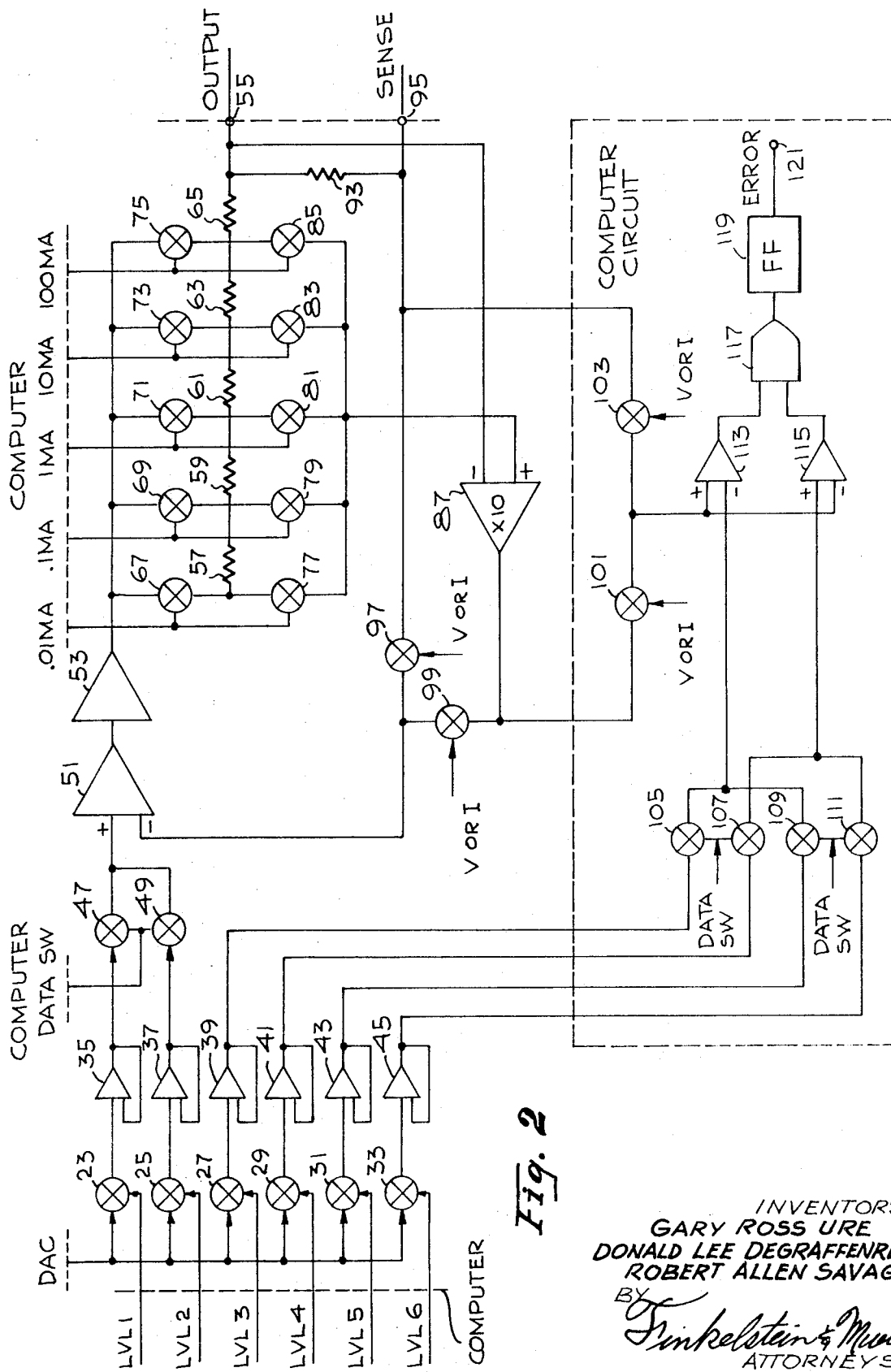
FIG. 2 is a circuit diagram of the pin electronics card employed in the embodiment of the invention shown in FIG. 1.

Referring now to FIG. 2, there is shown the circuitry of a pin electronics card 17 employed in the embodiment of FIG. 1. Field effect transistor (FET) switches 23, 25, 27, 29, 31 and 33 have one side of the switch connected to receive the analog reference level output of DAC 13. The control inputs for these FET input switches are connected to the computer 11 and the other side of the switches are connected to sample and hold amplifiers 35, 37, 39, 41, 43 and 45. The purpose of sample and hold amplifiers and the FET input switches is to establish the forcing and monitoring levels used to test the appropriate devices. These levels are initially determined by the computer program which controls the DAC. The levels programmed in DAC 13 are sequentially set into the sample and hold amplifiers by signals designated as level 1 through 6 from the computer. The functions of these levels are as follows:

| Level | Functions |
| --- | --- |
| 1 | Logic 1 forcing level |
| 2 | Logic 0 forcing level |
| 3 | Logic 1 upper limit monitor level |
| 4 | Logic 1 lower limit monitor level |
| 5 | Logic 0 upper limit monitor level |
| 6 | Logic 0 lower limit monitor level |

Analog data from DAC 13 is applied to the input of each sample and hold amplifier when its associated FET input switch is activated by the computer. The sample and hold amplifiers maintain the level of their outputs and are sequentially activated by the computer and the DAC in order to maintain the desired reference level. The output of sample and hold amplifier 35 which is the logic one forcing level feeds one side of FET switch 47. The output of sample and hold amplifier 37 which is the logic zero forcing level feeds one side of FET switch 49. The outputs of FET switches 47 and 49 are connected together and feed the plus input of pin driver differential amplifier circuit 51. Control of FET switches 47 and 49 is provided by the data switch signal from the computer. This signal determines if a logic one or a logic zero will be forced. If a logic one is forced FET switch 47 is closed and the output of sample and hold amplifier 35 is connected to the plus input of pin driver differential amplifier 51. If a logic zero is selected FET switch 47 is open and FET switch 49 is closed, thereby connecting the output of sample and hold amplifier 37 to the plus input of pin driver differential amplifier 51.

The output of pin driver differential amplifier 51 feeds the input of power amplifier 53. Pin driver differential amplifier 51 and power amplifier 53 constitute a two stage unity gain amplifier and a power amplifier output stage. The output of power amplifier 53 reflects the reference level established by the appropriate sample and hold amplifier and is applied to the digital module under test on pin 55. The output of pin driver differential amplifier remains stable when the levels on both inputs are equal. If the input signals on the minus input terminal is more negative then the signal on the plus input, pin driver differential amplifier increases the level of the output signal.

The precision resistor network comprised of resistors 57 59, 61, 63 and 65 and associated FET switches 67, 69, 71, 73, 75, 77, 79, 81, 83 and 85 route the voltage or current forcing signal to device pin 55 and assist in the appropriate monitoring operation. The configuration of the network varies according to the operating mode (voltage or current forcing). One side of FET switches 67, 69, 71, 73 and 75 is connected to the output of power amplifier 53. The other sides are connected to one side of FET switches 77, 79, 81, 83 and 85, respectively. Resistor 57 is connected between one side of switch 67 and one side of switch 69. Resistor 59 is connected between one side of switch 69 and one side of switch 71. Resistor 61 is connected between one side of switch 71 and one side of switch 73. Resistor 63 is connected between one side of switch 73 and one side of switch 75. Resistor 65 is connected between one side of switch 75 and pin 55. The controls for the precision resistor network are FET switches connected to sources of current range control from the computer.

Pin 55 is connected to the minus input of differential amplifier 87. The other side of switches 77, 79, 81, 83 and 85 are connected to the plus input of differential amplifier 87. Resistor 93 is connected between pin 55 and sense terminal 95 from the digital module under test. Sense terminal 95 is also connected to one side of FET switch 97 the other side of which is connected to the minus input of pin driver differential amplifier 51 and to one side of FET switch 99. The other side of FET switch 99 is connected to the output of differential amplifier 87 and to one side of FET switch 101. The other side of FET switch 101 is connected to one side of FET switch 103, the other side of which is connected to sense line 95. The output of sample and hold amplifier 39 which contains the reference level for the logic one upper limit is connected to one side of FET switch 105 while the output of sample and hold amplifier 41 which contains the reference level for a logic one lower limit is connected to one side of FET switch 107.

The output of sample and hold amplifier 43 which contains the reference level for a logic zero upper limit is connected to one side of FET switch 109, the other of which is connected to the other side of FET switch 105. The output of sample and hold amplifier 45 which contains the logic zero lower limit reference level is connected to the other side of FET switch 107. The controls for FET switches 97, 99, 101 and 103 are connected to the computer to receive signals to select the voltage or current forcing mode of operation. The common junction of the output of FET switches 105 and 109 are connected as an input to the minus input of differential amplifier 113. The common junction of FET switches 107 and 111 are connected to the plus input of differential amplifier 115. The plus input of differential amplifier 113 and the negative input of differential amplifier 115 are connected to the common junction of FET switches 101 and 103. The output of differential amplifiers 113 and 115 are inputs to OR-gate 117. The output of OR-gate 117 feeds error flip-flop 119 the output of which is connected to terminal 121.

The present embodiment employs FET switches 77, 79, 81, 83 and 85 to connect the plus input of differential amplifier 87 to the precision resistor side of the particular one of FET switches 67, 69, 71, 73 or 75 which is closed. This is done to compensate for the voltage drop across the closed switch which may carry high current and thus have a substantial voltage drop. In certain embodiments where lesser accuracy may be tolerated, the output of power amplifier 53 may be connected directly to the plus input of differential amplifier 87.

During the voltage forcing mode, the pin driver differential amplifier 51 and power amplifier 53 apply the selected reference level (representing a logic zero or a logic one depending upon the data switch signal from the computer) thru the precision resistor network to pin 55. During the voltage forcing mode, FET switches 99 and 103 remain open while FET switches 97 and 101 are closed. This connects sense line 95 to the minus input of pin driver differential amplifier 51 and the output of differential amplifier 87 into the comparator circuit through the plus and minus inputs of differential amplifiers 113 and 115, respectively. During the voltage forcing mode, the current drawn by the device under test is monitored to insure that its value complies with the limits established by the appropriate sample and hold amplifiers. The current measurement is performed by the precision resistor network of switches and sensing resistors shown to the right of power amplifier 53 and by differential amplifier 87.

During the voltage forcing mode, sense line 95 which monitors the voltage applied to the pin under test is fed back as the minus input to pin driver differential amplifier 51. Since pin driver differential amplifier 51 increases its output until both inputs are equal, the voltage on sense line 95 is driven to equal the logic level input to the plus input of pin driver differential amplifier 51. The employment of low impedance FET's in the switching network and in the pin driver differential amplifier results in the minimal IR drop in the sense line and virtually no current flow. The signal from power amplifier 53 is applied to the device under test through one to five resistors of the network of precision resistors made up of resistors 57, 59, 61, 63 and 65. The value of these resistors ranges from 10 ohms to $90^k$ ohms. The total value of the resistance placed in series depends on which which one of FET switches 67, 69, 71, 73 or 75 is activated by the current range control signals from the computer. The total resistance in the network is proportional to the selected current range (for example, the resistance equals 1,000 ohms on the 1 milliamp range) and the voltage drop across the network at full scale equals 1 volt regardless of the selected range.

The flow of current to pin 55 is measured by differential amplifier 87 which detects the total voltage drop across the precision resistors. For example, if the 1 milliamp current control range is utilized, then FET switches 71 and 81 would be closed while the remaining switches remain open. This would couple the output of power amplifier 53 through resistors 61, 63 and 65 to pin 55. The plus input of differential amplifier 87 is connected to the power amplifier side of resistor 61 while the minus input is connected to pin 55, so that the total voltage drop across the precision resistor appears across the inputs to differential amplifier 87. The output of differential amplifier 87 is connected to FET switch 101 and thus to the plus inputs of differential amplifier 113 and the minus input of differential amplifier 115 of the comparator circuit. If, for example, a logic one is being forced, then the data switch signal from the computer would close switches 105 and 107 and open switches 109 and 111. This couples the logic one upper limit level into the minus input of differential amplifier 113 while the logic one lower limit level is connected from switch 107 to the plus input of differential amplifier 115. If either of the plus inputs to differential amplifiers 113 and 115 exceeds the negative inputs as would occur if the limits were exceeded, then a true output is produced from the output of the respective differential amplifier. OR-gate 117 couples a true output from either differential amplifier to flip-flop 119 causing it to change states and produce an error signal. If the current monitored by differential amplifier 87 is too high, then the plus input signal to differential amplifier 113 will exceed the upper limit signal received on the minus input and a true level will be generated at the output. If, on the other hand, the signal is too low, then the lower limit level appearing at the plus input to differential amplifier 115 will be higher than the signal from differential amplifier 87 and a true output will appear at the output of differential amplifier 115 activating the error network.

In the current forcing mode, pin driver differential amplifier 51 applies a current level, representing a logic zero or a logic one, thru pin 55 to the digital module under test. The magnitude of this current is established by the reference level received from the appropriate sample and hold amplifier. The voltage at the device input is then monitored to insure that its value complies with the limits established by the sample and hold amplifiers. In the current mode, sense line 95 is connected to the comparator whereas the output of differential amplifier 87 is applied to the minus input pin driver differential amplifier 51. In the current mode, FET switches 99 and 103 are closed while FET switches 97 and 101 are open. Differential amplifier 87 now provides a signal to the minus input of pin driver differential amplifier 51 representative of the current flow to the load. Pin driver differential amplifier 51 adjusts its output so as to drive a current sufficient to produce a signal through differential amplifier 87 to equalize its inputs. The comparator circuit operates to detect errors in exactly the same manner as it did for the voltage forcing mode.

Figure 3:
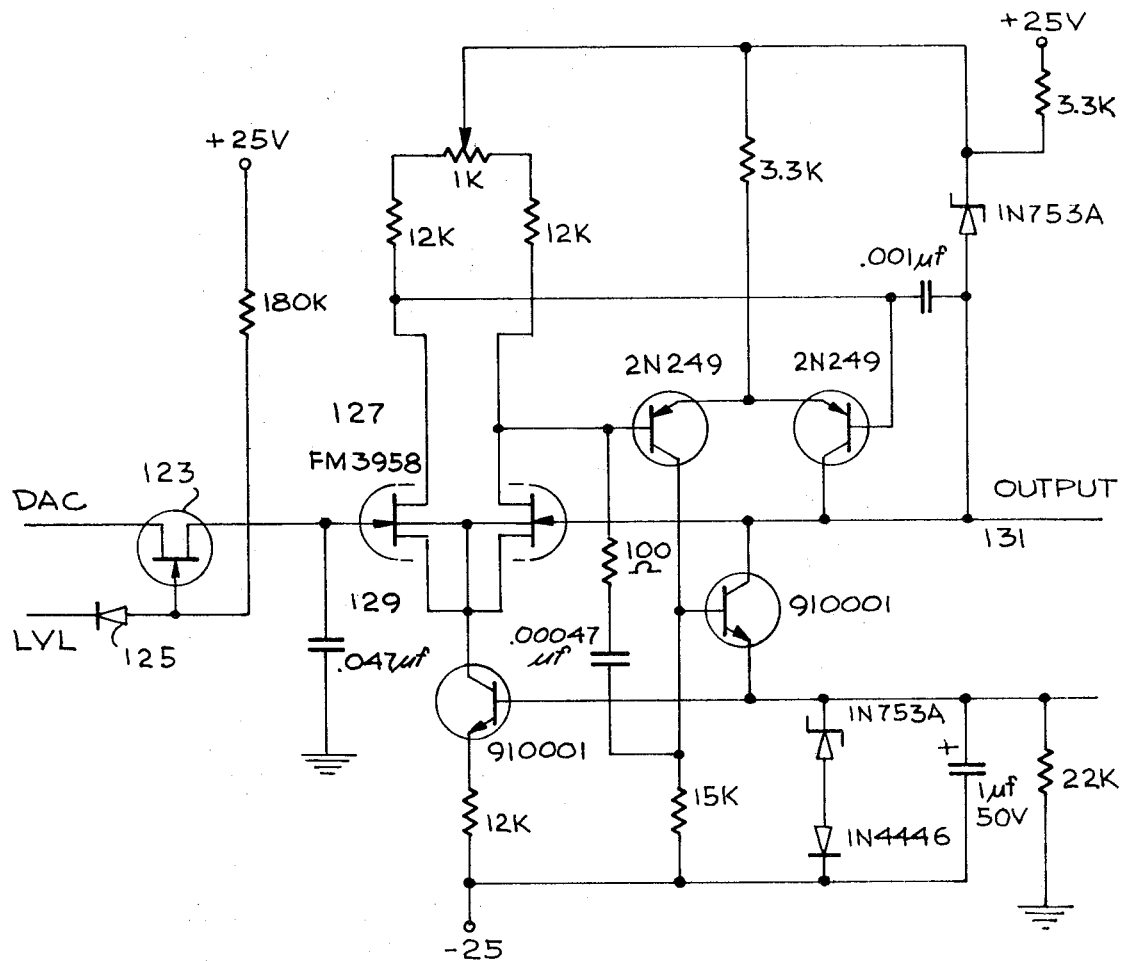
FIG. 3 is a circuit diagram of an FET input switch and sample and hold amplifier employed in the pin electronics cards.

Referring now to FIG. 3, there is shown an input FET switch and a sample and hold amplifier circuit. Input FET switch is comprised of FET 123 with its source terminal connected to the DAC analog output and its gate terminal connected by diode 125 to the computer so as to receive the level sequencing commands. The remaining portion of the circuit comprises the sample and hold amplifier of which dual FET 127 forms the input element. In this particular embodiment, dual FET is a National FM 3958 dual FET. One of the gate inputs of dual FET 127 is connected to the drain terminal of FET 123, coupled between that gate input and ground is capacitor 129. Capacitor 129 serves as a storage capacitor for the analog level received from the DAC. This analog level is reflected at the output terminal 131 of the sample and hold amplifier. Since the level to which this storage capacitor 129 is charged is subject to certain amount of decay the amplifier is continuously updated by the computer and the DAC in order to maintain the desired reference level.

Figure 4:
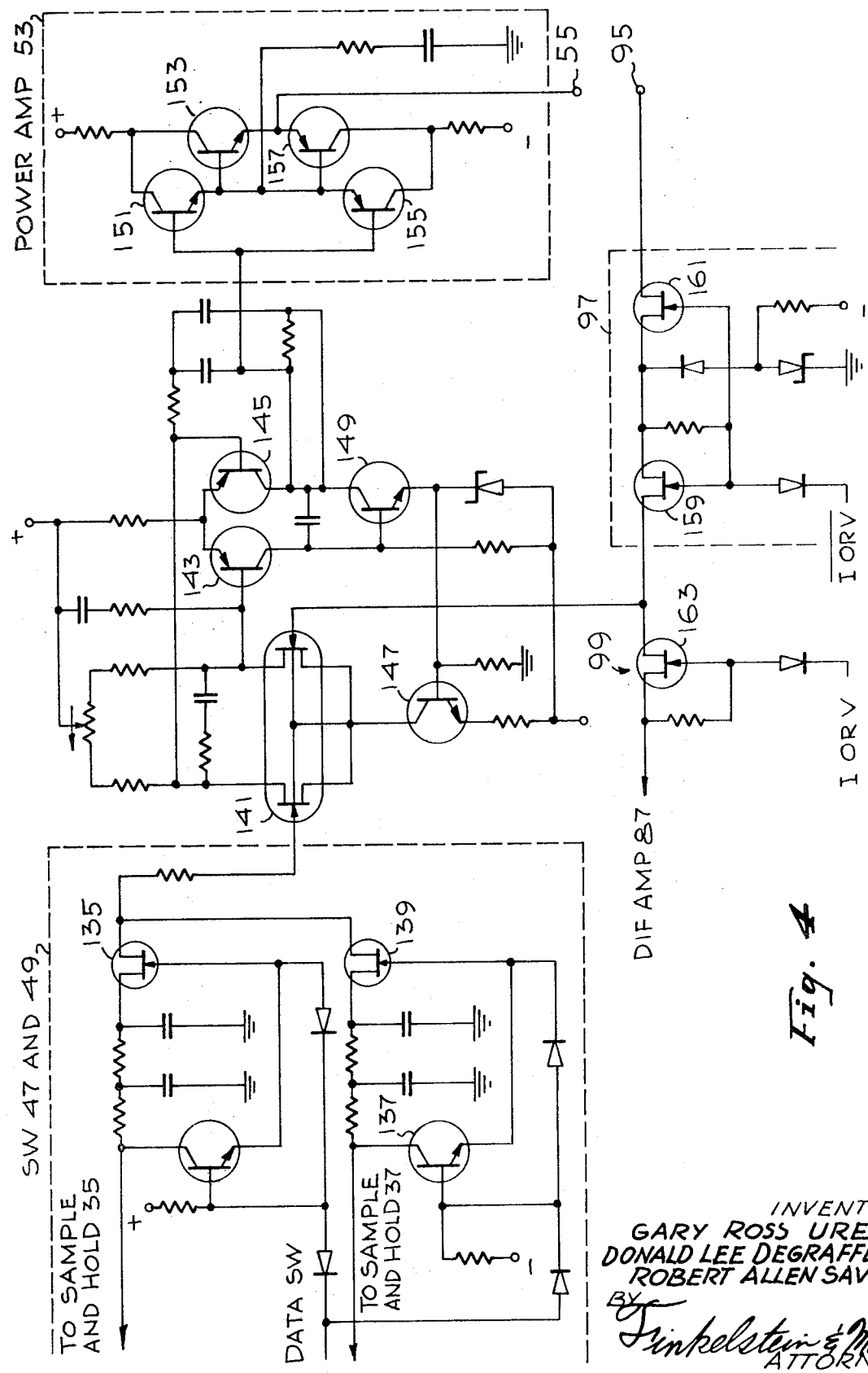
FIG. 4 is a circuit diagram of the pin driver differential amplifier employed in the pin driver electronics card.

Referring now to FIG. 4, there is shown a circuit for the pin driver differential amplifier 51, the power amplifier 53, FET switches 47 and 49 and FET switches 97 and 99. FET switch 47 receives its input from sample and hold amplifier 35 and is comprised of transistor 133 and FET 135. Switch 49 receives its input from sample and hold amplifier 37 and is comprised of conventional transistor 137 and FET transistor 139. The data switch signal from the computer controls the status of switches 47 and 49. The outputs of these switches appear at the drain terminals of FET 135 and 139. These drain terminals are connected together and coupled to a gate of the input dual FET transistor 141 of pin driver differential amplifier 51. Pin driver differential amplifier 51 comprises a two stage unity gain amplifier made up of dual FET 141 and transistors 143, 145, 147 and 149. The output of pin driver differential amplifier 51 appears at the common collector junction of transistors 145 and 149 and is connected to the base of transistor 151 of power amplifier 53. The remainder of power amplifier 53 is comprised of transistors 153, 155 and 157. The output of power amplifier 53 appears at the common emitter junction of transistors 153 and 157 and is connected to pin 55 of the digital module under test thru the precision resistor network.

Switch 97 is comprised of FET 159 and 161 and received its control input via the computer. FET switch 99 is comprised of single FET 163. The source terminal of FET 163 is connected to the output of differential amplifier 87. The control input from the computer is coupled to the drain terminal of FET 163. The drain terminals of FETs 159 and 163 are connected together and to the other gate terminal of dual FET 141.

Those skilled in the art may find many variations and adaptations of the present invention, the following claims are intended to cover all such variations and adaptations falling within the true scope and spirit of the invention.

We claim:

1. A pin electronics circuit for use in a computer controlled digital circuit module tester in which drive signals for voltage or current forcing are impressed on individual pins of multipin modules, the response at individual pins is compared with predetermined limits, and the drive levels and limit levels are provided by an analog source comprising, in combination;

a first switch having two sides and a control input and having one side connected to the analog source to receive a signal representing the level for a logic one, and the control input connected to the computer;

a second switch having two sides and a control input and having one side connected to the analog source to receive a signal representing the level for a logic zero, and the control input connected to the computer;

a first sample and hold amplifier having an input and an output and having the input connected to the output of the first switch and maintaining an output signal equal in amplitude to that of the signal appearing at the input terminal;

a second sample and hold amplifier having an input and an output and having the input connected to the output of the second switch and maintaining an output signal equal in amplitude to that of the signal appearing at the input terminal;

a third switch having first and second sides and a control input and having the first side connected to the output of the first sample and hold amplifier and the control input connected to the computer to receive the data signal representative of a logic one or a logic zero forcing condition which causes the switch to close when a logic one condition is selected and to open when a logic zero condition is selected;

a fourth switch having first and second sides and a control input and having the first side connected to the output of the second sample and hold amplifier, and the second side connected to the second side of the third switch, and the control input connected to the computer to receive a data signal representative of a logic one forcing or a logic zero forcing condition to close the switch for a logic zero condition and open it for a logic one;

a pin driver differential amplifier circuit having first and second inputs and an output, operating to increase the level of the output signal whenever the level of the input signal to the second input is lower than the level of the input signal to the first input and having the first input connected to the second sides of the third and fourth switches;

an output terminal for connection to the pin of the circuit module under test;

a plurality of fixed precision resistors;

first switch means connected to the computer for connecting selected combinations of the fixed resistors in series with the pin driver differential amplifier circuit output and the output terminal;

first differential amplifier having first and second inputs and an output and having the first input connected to the output terminal and the second input connected to the output of the pin driver differential amplifier circuit;

a sense terminal coupled to the pin of the circuit under test;

a fifth switch having first and second sides and a control input and having the first side connected to the sense terminal and the second side connected to the second input of the pin driver differential amplifier circuit, and the control input connected to the computer to receive a signal representative of the voltage or current forcing mode of operation;

a sixth switch having first and second sides and a control input and having the first side connected to the output of the first differential amplifier, the second side connected to the second input of the pin driver differential amplifier circuit, and the control input connected to the computer to receive a signal representative of the voltage or current forcing mode of operation.

2. The apparatus as described in claim 1 including:

seventh, eighth, ninth and 10th switches each having first and second sides and a control input, each having the first side connected to the analog source and having the control input connected to the computer to receive signals representative of a logic one upper limit level, logic one lower limit level, logic zero upper limit level and logic zero lower limit level respectively;

third, fourth, fifth and sixth sample and hold amplifiers each having an input and an output and having the inputs connected to the other side of the seventh, eighth, ninth and 10th switches respectively;

an 11th switch having first and second sides and a control input and having the first side connected to the output of the third sample and hold amplifier;

a 12th switch having first and second inputs and a control input and having the first side connected to the output of the fourth sample and hold amplifier; the control inputs of the 11th and 12th switches connected to the computer to receive a data switch signal representative of a logic one or a logic zero forcing condition which causes the 11th and 12th switches to close when logic one condition is selected and to open when a logic zero condition is selected;

a 13th switch having first and second sides and a control input and having the first side connected to the output of the fifth sample and hold amplifier;

a 14th switch having first and second sides and a control input and having the first side connected to the output of the sixth sample and hold amplifier;

the control inputs of the 13th and 14th switches connected to the computer to receive a data switch signal representative of a logic one or a logic zero forcing condition which causes the 13th and 14th switches to close when a logic zero condition is selected and to open when a logic one condition is selected;

a 14th switch having first and second sides and a control input and having the first side connected to the sense terminal;

a 16th switch having first and second sides and a control input and having the first side connected to the second side of the 15th switch and the second side connected to the output of the first differential amplifier;

the control inputs for the 15th and 16th switches connected to the computer to receive a signal representative of the voltage or current forcing mode of operation such that in the voltage forcing mode of operation the 15th switch is closed and the 16th switch is open and in the current forcing mode of operation the 15th switch is open and the 16th switch is closed;

a second differential amplifier having first and second inputs and an output and having the first input connected to the second side of the 15th switch and the second input connected to the second side of the 12th and 14th switches;

a third differential amplifier having first and second inputs and an output and having the first input connected to the second side of the 13th switch and the second input connected to the second side of the 15th switch;

an OR gate having first and second inputs and an output and having the first input connected to the output of the second differential amplifier and the second input connected to the output of the third differential amplifier; and the output of the OR gate connected to an error output terminal for providing a signal representative of any error.

3. The apparatus as described in claim 2 including a bistable multivibrator circuit having an input and an output; and the bistable multivibrator circuit connected between the OR gate output and the error output terminal having the input connected to the output of the OR gate and the output connected to the error terminal.

4. A pin electronics circuit for use in a computer controlled digital circuit module tester in which drive signals for voltage or current forcing are impressed on individual pins of multipin modules and the response at individual pins is compared with predetermined limits with the drive levels and limit levels provided by an analog source comprising, in combination:

first switching means coupled to the analog source and to the computer for receiving analog signals from the analog source representative of the levels for a logic one, logic zero, logic one upper limit, logic one lower limit, logic zero upper limit and logic zero lower limit and sequenting commands from the computer;

sample and hold means coupled to the first switching means for sequentially receiving the analog level signals from the analog source in accordance with the sequenting controls for storing these levels, and for providing output signals representative of the levels receiver;

a pin driver means having first and second inputs and an output operating to increase the level of the output signal whenever the level of the input signal to the second input is lower than the level of the input signal to the first input;

second switching means connected to sample and hold means, to the first input of the pin driver means and the computer to switch under computer control a level signal representative of a logic one or a logic zero into the first input of the pin driver means;

an output terminal for connection to the pin of the circuit module under test;

a plurality of fixed resistors;

third switching means connected to the computer and the fixed resistor for selectively connecting combinations of the fixed resistors in series with the pin driver means output and the output terminal;

a sense line coupled to the pin of the circuit module under test;

amplifier means having first and second inputs and an output and having the first input connected to the output terminal and the second input connected to the output of the pin driver means;

a first switch having first and second sides and a control input and having the first side connected to the sense line and the second side connected to the second input of the pin driver means;

a second switch having first and second sides and a control input and having the first side connected to the output of the amplifier means and the second side connected to the second input of the pin driver means;

the control inputs of the first and second switches connected to the computer to receive signals representative of a voltage or current forcing mode of operation such that in the voltage forcing mode the first switch is open and the second switch is closed and in the current forcing mode the first switch is closed and the second switch is open;

comparison circuitry for comparing the logic one and logic zero signal levels monitored at the pin under test with the logic level limits from the analog source;

third switching means connected to the sample and hold means, the comparison circuit and to the computer to couple under computer control the logic one upper and lower limits to the comparison circuitry during the logic one forcing conditions and to connected the logic zero upper and lower limits levels to the comparison circuitry during the logic zero forcing condition; and fourth switching means connected to the sense line, the output of the amplifier means, the comparison circuitry, and the computer for connecting the sense line to the comparison circuit and the amplifier means output to the second input of the pin driver means during the current forcing mode of operation and for connecting the output of the amplifier means to the comparison circuit and the sense line to the second input of the pin driver means during the current forcing mode of operation.

5. The apparatus a claimed in claim 4 wherein the sense line is coupled through a resistor to the output terminal.

6. The apparatus as claimed in claim 4 wherein the sample and hold means comprises:

a plurality of individual sample and hold amplifiers each adapted to receive and store a separate level signal.

7. A pin electronics circuit for use in a computer controlled digital circuit module tester in which drive signals for voltage or current forcing are impressed on individual pins of multipin modules and the response at individual pins is compared with predetermined limits with the drive levels and limit levels provided by an analog source comprising, in combination:

first switching means coupled to the analog source and to the computer for receiving analog signals from the analog source representative of logic levels and the limits for the levels and sequencing commands from the computer;

sample and hold means coupled to the first switching means for sequentially receiving the analog level signals from the analog source in accordance with the sequenting controls for storing these levels, and for providing output signals representative of the levels received;

a pin driver means having first and second inputs and an output operating to increase the level of the output signal whenever the level of the input signal to the second input is lower than the level of the input signal to the first input;

second switching means connected to sample and hold means, to the first input of the pin driver means and the computer to switch under computer control a level signal representative of a logic one or a logic zero into the first input of the pin driver means;

an output terminal for connection to the pin of the circuit module under test;

a plurality of fixed resistors;

third switching means connected to the computer and the fixed resistors for selectively connecting combinations of the fixed resistors in series with the pin driver means output and the output terminal;

a sense line coupled to the pin of the circuit module under test;

amplifier means having first and second inputs and an output and having the first input connected to the output terminal and the second input connected to the output of the pin driver means;

a first switch having first and second sides and a control input and having the first side connected to the sense line and the second side connected to the second input of the pin driver means;

a second switch having first and second sides and a control input and having the first side connected to the output of the amplifier means and the second side connected to the second input of the pin driver means;

the control inputs of the first and second switches connected to the computer to receive signals representative of a voltage or current forcing mode of operation such that in the voltage forcing mode the first switch is open and the second switch is closed and in the current forcing mode the first switch is closed and the second switch is open;

comparison circuitry for comparing the logic one and logic zero signal levels monitored at the pin under test with the logic level limits from the analog source;

third switching means connected to the sample and hold means, the comparison circuit and to the computer to couple under computer control the logic one limits to the comparison circuitry during the logic one forcing condition and to connect the logic zero limits levels to the comparison circuitry during the logic zero forcing condition; and fourth switching means connected to the sense line, the output of the amplifier means, the comparison circuitry, and the computer for connecting the sense line to the comparison circuit and the amplifier means output to the second input of the pin driver means during the current forcing mode of operation and for connecting the output of the amplifier means to the comparison circuit and the sense line to the second input of the pin driver means during the current forcing mode of operation.

* * * * *